Feb. 18, 1947. J. H. CALBECK 2,416,044
PROCESS OF TREATING ZINC OXIDES
Filed Feb. 26, 1943
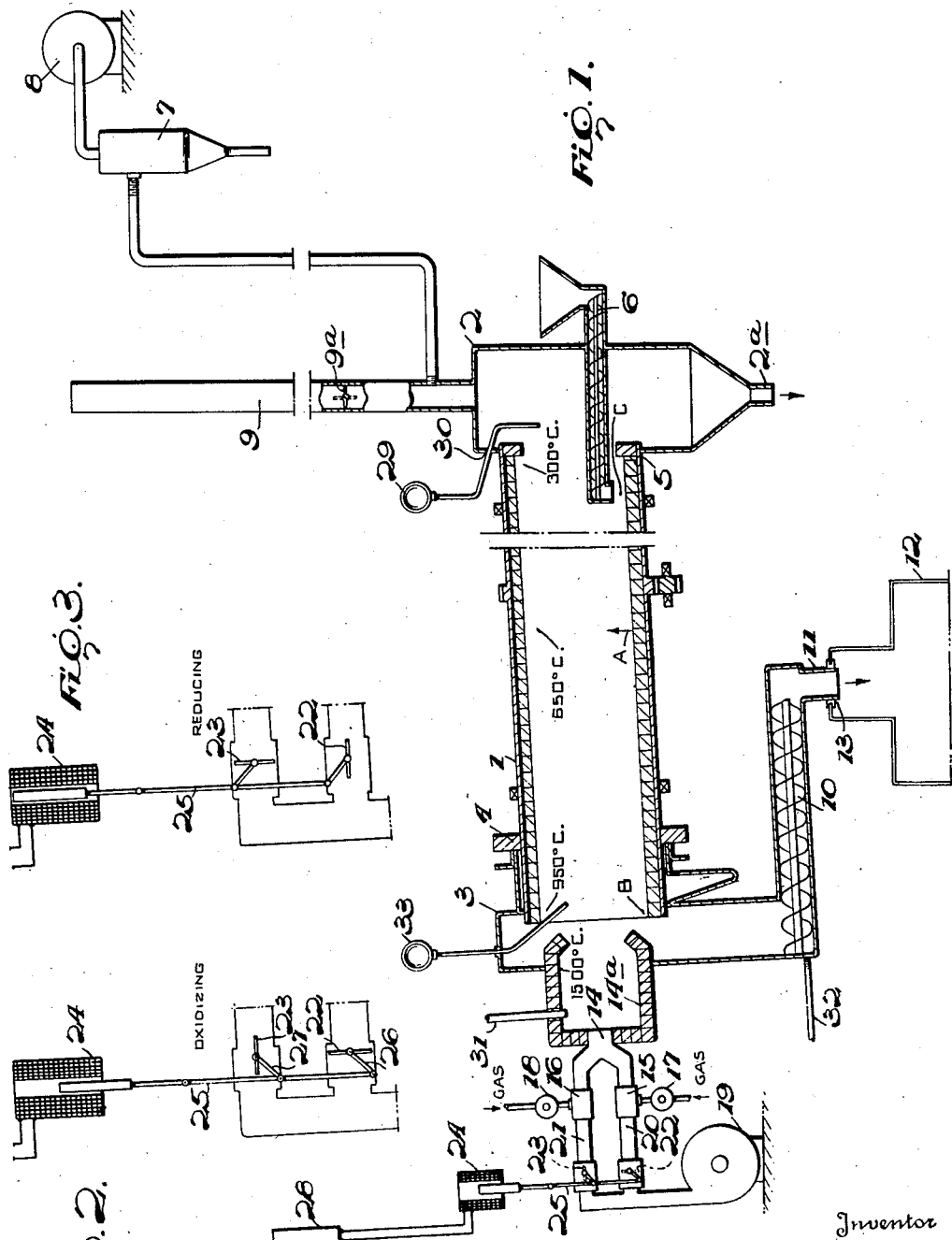
Inventor
John Henry Calbeck.
By Cameron, Kerkam + Sutton
Attorneys.

Patented Feb. 18, 1947

2,416,044

UNITED STATES PATENT OFFICE 2,416,044

PROCESS OF TREATING ZINC OXIDES

John Henry Calbeck, Columbus, Ohio, assignor to American Zinc, Lead & Smelting Company, St. Louis, Mo., a corporation of Maine Application February 26, 1943, Serial No. 477,305

18 Claims. (Cl. 23—148)

This invention relates to a process for treating zinc oxide; and has for its objects, among others, to improve color, to remove objectionable sulfur compounds, to refine and at the same time not destroy the texture, oil absorption or other physical properties of the oxide, and especially to recover therefrom as a valuable by-product without substantial volatilization of any metallic zinc the small percentages of cadmium that are present in most commercial zinc oxides and which have heretofore been allowed to remain in the oxide, and to secure a final zinc oxide that is chemically pure.

A further object is to secure these results by reheating zinc oxide under conditions of controlled temperatures, time and atmospheres.

Another object is to improve the color of American process or other zinc oxides by reheating the same at relatively low temperatures by a heating flame which is maintained clean and free of soot or solid carbon; and to procure a white non-densified zinc oxide by treatment of the zinc oxide in a high velocity gaseous environment to remove impurities without changing the texture of the zinc oxide regardless of whether the original texture was light and fluffy or heavy.

Another object is to provide a continuous method for treating zinc oxide in an air-sealed furnace wherein the flame is alternated from an oxidizing one to a reducing one or vice versa, it being immaterial whether the start is with the oxidizing or reducing if the intervals are short, and the reaction zone in the furnace is of sufficient length, and the movement of the oxide is properly coordinated.

Another object is directed to reheating the zinc oxide at temperatures high enough to recover valuable by-products such as cadmium while only a very small percentage of metallic zinc (not more than 1.2%) is lost by volatilization.

Commercial zinc oxide for use as a pigment is produced by oxidizing the vapors obtained by the volatilization of zinc. When zinc metal is used, an oxide of high chemical purity is produced and is known commercially as French process zinc oxide. Such oxides require no further treatment. Of greater importance commercially is the type of zinc oxide known as American process which is manufactured from zinc ores. American process zinc oxide is made by burning a mixture of zinc ore and carbonaceous fuel on a flat grate. The zinc content of the ore is reduced to metallic zinc vapors which escape with the products of combustion, and these vapors are oxidized with air in a suitable combustion chamber. A smoke or fume is produced which consists of minute solid particles of zinc oxide in suspension in a hot gaseous mixture. This fume is cooled by passing through pipes and is filtered in bags to recover the zinc oxide. American process zinc oxide may contain small amounts of impurities that have been present in the ore such as sulfur compounds, cadmium, lead, arsenic and the like, depending on the character of the ore from which the oxide is obtained. If obtained from very pure ores American process zinc oxide may be suitable for many purposes and may be packed and sold without further treatment.

In order to produce an American process zinc oxide of the highest quality it is necessary to refine or reheat it, regardless of how pure the ore may be from which it is produced. The primary purpose of refining heretofore has been to improve the color. Second in importance has been the removal of objectionable sulfur compounds from the oxide which is necessary when ores, high in sulfur, are used.

A great number of methods for conducting this reheating step are described in the patent literature. In U. S. Patent No. 406,868 (1889) Bartlett describes a reheating process in which he teaches reheating in the presence of currents of air at a temperature not exceeding 1000° F. (538° C.) with constant agitation. Later the same inventor, U. S. Patent No. 480,686, modified his process by excluding air and substituting a sulfurous atmosphere, the purpose of which was to sulfate any lead or cadmium that might be present in the oxide and thereby improve the color of the product. Still later, in 1902, the same inventor, U. S. Patent No. 715,238, taught the use of a reducing atmosphere produced by burning coal with a deficiency of air. In this process the zinc oxide or fume was reheated in batches in a reverberatory furnace. The oxide, when first introduced into the furnace, was exposed to a very smokey flame which was passed over the oxide until it was thoroughly contaminated with a carbonaceous material. Then the heating was continued with a flame free of solid carbon particles until all the carbonaceous material had been burned out. Thus was introduced to the art for the first time the device for adding solid carbonaceous material to zinc oxide prior to reheating.

The early inventors reheated the zinc oxide for the purpose of densifying the oxide as a substitute for white lead. Later investigators found that densification was objectionable for other uses and many attempts were made to reheat zinc oxide to obtain good color and at the same time to avoid any densification of the product.

For example, Breyer and Bunce, U. S. Patent No. 1,339,544, claimed a reheating without densification which comprised passing the oxide by the action of gravity in the form of a thin stream through a highly heated atmosphere. No carbonaceous matter was added and the furnace was designed to prevent the admission of air so that the entire treatment was in a stagnant atmosphere. Later, the same inventors, U. S. Patent No. 1,339,545, in a similar type of apparatus, provided "an adequate supply of oxygen to the zinc oxide while the latter is undergoing the reheating treatment" primarily to improve the color.

In 1919, Wemple, U. S. Patent No. 1,292,976, described a process for reheating zinc oxide wherein the "coarsening of grain due to excessive heating was avoided." He taught that if a solid carbonaceous material, such as lamp black, was added to the zinc oxide in proper amount prior to reheating, objectionable sulfur compounds could be removed, the color would accordingly be improved, and no objectionable densification would occur because of the relatively low temperatures required. Furthermore, Wemple taught that the cadmium and lead contents were necessary to the production of a good color and he made every effort to retain these impurities in the oxide and even advocated the addition of some cadmium or lead to the product to absorb the sulfates in case there was not sufficient present as a natural impurity. Wemple states "Having obtained the crude product as described, to refine the same for use as a pigment, it is necessary only to eliminate the soluble zinc salts [zinc sulfate] and it may be understood that this process of elimination must leave the lead and cadmium present unchanged in the unobjectionable form of sulfates." This process has been successful and has been used without interruption for reheating all the lead-free zinc oxide produced by the American Zinc, Lead & Smelting Co. since 1919.

There are many contradictions in the prior art. One inventor teaches the use of an oxidizing atmosphere, another teaches the use of a reducing atmosphere, one teaches that the product must be kept free from contamination from any of the products of combustion of the furnace, while another advocates the use of these products to assist in the refining operation. One proposed to prevent densification by agitation, another by the use of carbon.

The present invention involves a simple, novel and economical procedure comprising reheating zinc oxide in an atmosphere which is controlled with respect to temperature, composition and velocity, so as to improve the color of the zinc oxide, remove sulfur compounds and other impurities, control and not destroy the oil absorption, texture and other physical properties, recover the cadmium as a valuable byproduct and secure a chemically pure zinc oxide.

I have discovered that the above results will be obtained when the following conditions are maintained during the procedure:

(1) It is important that the vapors over the zinc oxide circulate in order that sulfur impurities may be removed at relatively low temperatures. This circulation is just as important, for sulfur removal, as the composition of the atmosphere circulated over the zinc oxide.

For example, in Table I are given the results of reheating a zinc oxide containing 0.177% sulfur.

TABLE I

*Reheating of crude zinc oxide*

| Run No. | Temp., °C. | Time of heating, minutes | Per cent sulfur |
|---|---|---|---|
| IN STAGNANT AIR | | | |
| The original crude AZO 55 | | | 0.177 |
| 7 | 650 | 30 | 0.177 |
| 8 | 650 | 40 | 0.172 |
| 9 | 650 | 80 | 0.172 |
| 10 | 700 | 20 | 0.169 |
| 11 | 700 | 40 | 0.172 |
| 12 | 700 | 80 | 0.173 |
| IN A CURRENT OF AIR | | | |
| 38 | 650 | 20 | 0.063 |
| 39 | 650 | 40 | 0.054 |
| 40 | 700 | 20 | 0.060 |
| 41 | 700 | 40 | 0.054 |
| IN A CURRENT OF STEAM | | | |
| 13 | 650 | 20 | 0.152 |
| 14 | 650 | 40 | 0.147 |
| 15 | 650 | 80 | 0.142 |
| 16 | 700 | 20 | 0.126 |
| 17 | 700 | 40 | 0.084 |
| 18 | 700 | 80 | 0.069 |
| IN A CURRENT OF $CO_2$ | | | |
| 19 | 650 | 20 | 0.14 |
| 21 | 650 | 40 | 0.129 |
| 22 | 650 | 80 | 0.118 |
| 23 | 700 | 20 | 0.121 |
| 24 | 700 | 40 | 0.087 |
| 25 | 700 | 80 | 0.08 |
| IN A CURRENT OF NITROGEN | | | |
| 26 | 650 | 20 | 0.142 |
| 27 | 650 | 40 | 0.135 |
| 28 | 650 | 80 | 0.123 |
| 29 | 700 | 20 | 0.100 |
| 30 | 700 | 40 | 0.089 |
| 31 | 700 | 80 | 0.072 |

It will be observed that in stagnant air practically no removal of sulfur results after treatment for as long as 60 minutes and at temperatures as high as 700° C. On the other hand when air is passed over the oxide at the rate of 50 to 200 feet per minute the sulfur is substantially reduced. A similar effect is obtained when steam, $CO_2$ and nitrogen are circulated through the kiln. The temperatures in Table I are below the decomposition temperature of $ZnSO_4$ and below that point where objectionable densification may occur.

(2) A clean reducing atmosphere, free of solid carbon or soot in suspension, will result in a further removal of sulfur, and will also remove a large percentage of any cadmium present in the oxide at temperatures below that where densification may occur. This is illustrated in Table II.

TABLE II

*Reheating of crude zinc oxide in a reducing atmosphere*

| Run No. | Temp., °C. | Time of heating, minutes | Per cent cadmium | Per cent total sulfur |
|---|---|---|---|---|
| Crude 44 | | | 0.351 | 0.393 |
| 70 | 650 | 5 | 0.195 | 0.15 |
| 70 | 650 | 10 | 0.249 | 0.159 |
| 70 | 650 | 20 | 0.082 | 0.142 |
| 70 | 650 | 30 | 0.078 | 0.165 |
| 70 | 650 | 70 | 0.054 | 0.099 |
| 71 | 700 | 60 | 0.039 | 0.102 |
| 72A | 700 | 120 | | 0.05 |

A reducing atmosphere containing a mixture of $H_2$ and CO was passed over the oxide at different temperatures. It will be noted that an oxide containing 0.351% cadmium and 0.392% sulfur may be reheated in this atmosphere for 60 minutes at 700° C. and the sulfur reduced to 0.102% and the cadmium content reduced to 0.039%.

(3) By alternating the atmosphere from reducing to oxidizing or vice versa when the intervals are short, the reaction zone in the furnace is of sufficient length, and the movement of the oxide is properly coordinated, a further reduction in cadmium and sulfur content occurs and, in addition, a color superior to any obtained heretofore by reheating is secured. Sulfur and cadmium removal may be accomplished without the oxidizing cycle but the color will not be enhanced by such treatment. However, by alternating from oxidizing to reducing or vice versa in the furnace a superior color is obtained when treating ores containing oxides or other removable impurities. Desirable results may be obtained by operating two reheating furnaces in tandem, the first under reducing conditions and the second under oxidizing conditions. The alternating is highly desirable from the viewpoint of cadmium recovery. During the reduction step some of the cadmium is reduced to cadmium sulfide. During the oxidizing step this cadmium sulfide is oxidized to cadmium sulfate; and in this form is more readily removed by reduction to metallic cadmium vapors.

(4) The use of a clean reducing atmosphere has proven to be more effective in every respect than the addition of lamp black or other solid carbonaceous material to the oxide. The purpose of adding carbonaceous material heretofore has been to produce mildly reducing conditions that assist in breaking the sulfates to sulfites which latter are vaporized at lower temperatures, but when these small particles of carbon are burned they form minute local high temperature reduction zones or spots in the charge. The temperature of these spots may momentarily go as high as 1200° C. to 1400° C., which is well above the point where objectionable densification occurs. At this high temperature not only are the compounds of sulfur and cadmium reduced but some zinc also is reduced to the metallic state in the vapor phase. These zinc vapors migrate rapidly away from the reducing zone to colder regions in the charge where they are oxidized and recondensed on the surface of other zinc oxide particles. This results in a growth in particle size of the oxide, or in other words, densification. I have found that when a carefully controlled reducing atmosphere is used such as an atmosphere having a high percentage of carbon monoxide and hydrogen but wholly free of any carbon particles in suspension, i. e., soot, the sulfur and cadmium compounds are readily reduced and volatilized at temperatures below the point where an appreciable amount of zinc oxide is reduced; and consequently there is no densification or growth in particle size of the zinc oxide.

While I prefer for present purposes to avoid densification it is nevertheless pointed out that such densification may be secured by extending the period of the oxidizing cycle with respect to the reducing cycle.

(5) The products of combustion of a fuel, when properly controlled to eliminate smoke, provide the proper atmosphere in the furnace and at the same time provide heat sufficient to raise the zinc oxide to the required temperature. Such gases should have the necessary velocity in order to effectively remove the impurities and assist in the refining process and an atmosphere controlled as to velocity, composition and temperature may be secured for the purposes of my process in both direct-fired gas furnaces and muffle type furnaces.

The velocity of the gases will vary dependent upon the length and interior diameter of the furnace or kiln. I have found that in a rotary furnace 70 feet long and 5 feet internal diameter the velocity of the gases at the lower end of the rotary furnace where the oxide is discharged is approximately 200 feet per minute and at this point the temperature of the gases may reach a maximum of 950° C. At a point midway between the discharge end of the furnace and the end where the oxide is introduced the gases will have a velocity of approximately 150 feet per minute, and at this point the temperature of the gases is approximately 650° C. which is approximately the minimum temperature at which chemical reactions take place. Between this point and the end of the furnace where the oxide is introduced is a preheating zone for the oxide. At the upper end of the rotary furnace where the oxide is introduced the velocity of the gases is approximately 50 feet per minute and the temperature of the gases at this point is approximately 300° C.

It will be noted that, in considering the velocity of a gas the temperature must also be considered because, for example, 2000 cu. ft. of gas at room temperature expands to 51,000 cu. ft. at 900° C.; and as noted in the furnace just indicated the temperature range of the gases is between 900° C. and 300° C. Substantially the same weight of gas is passing through the end of the furnace where the temperature of the gases is 300° C. as is passing through the hot end but the volume has been materially reduced by the cooling. It is for this reason that the velocities range from 200 feet per minute at the end of the furnace where the temperature may be 950° C. to 50 feet per minute at the end of the furnace where the temperature of the gases is approximately 300° C.

The zinc oxide dust that passes out through the discharge 2a of the bonnet 2 is small in quantity and low in cadmium content. Most of the dust falls out of the stream as the velocity drops, and mixes with the downwardly flowing oxide.

(6) I have found that none of the desirable physical properties are sacrificed with the removal of cadmium as an impurity from the zinc oxide; and, further by the removal of the sulfur and cadmium I have been able to produce an American process zinc oxide equal in purity and quality to the French process zinc oxide for many purposes, for example, for use in quick-curing rubber compounds. Further the present refining process is the first of which I have knowledge that simultaneously recovers the cadmium as a valuable by-product. In many American process zinc oxides treated by my process the value of the cadmium recovered more than covers the total refining expense.

The chemical composition of the cadmium and sulfur impurities which have not been removed are of extreme importance because of their behavior when the zinc oxide is subsequently used for certain purposes. For example, small percentages of cadmium oxide or sulfate have a very detrimental effect if the zinc oxide is used in compounding rubber with thiuram accelerators. However, cadmium sulfide has no detrimental effect. Therefore I control the atmosphere in the furnace in such a fashion that any residual cadmium will be there as cadmium sulfide.

Similarly the SO4 ion is objectionable in certain rubber compounds but sulfur present as sulfide has no detrimental effect. Therefore, the ratio of reducing to oxidizing time is manipulated so as to leave no residual sulfur in the form of sulfate nor any residual cadmium in the form of oxide or sulfate. If it is desired to retain the sulfur compounds as sulfides and the cadmium as sulfide the zinc oxide is cooled in a non-oxidizing atmosphere after it is discharged from the kiln. If for any reason it is desired to have the residual sulfur compounds in the form of sulfate, it is only necessary to allow the zinc oxide to cool in the presence of air.

In Tables III and IV are presented data illustrating the effect of non-oxidizing cooling upon both the water soluble cadmium and the water soluble sulfur contents. Zinc oxides refined in the Wemple refinery have water soluble sulfurs running from 46 to 100% of the total sulfur content. On the other hand, water soluble sulfurs in oxides refined by my improved process and cooled in a non-oxidizing atmosphere do not exceed 10% of the total sulfur content.

In the case of cadmium my improved product cooled in a non-oxidizing atmosphere contains no water soluble cadmium and when cooled in an oxidizing atmosphere only about one-fifth of the total cadmium is present in a water soluble form. On the other hand oxides refined in the Wemple furnace have between two-thirds and three-fourths of their cadmium content in a water soluble form.

TABLE III

| Number | Sulfur | | Per cent soluble | Cooled |
|---|---|---|---|---|
| | Total | Soluble | | |
| 42 | 0.062 | 0.00 | 0.0 | Non-oxidizing. |
| 43 | .085 | .002 | 2.4 | Do. |
| 44–2 | .030 | .002 | 6.2 | Do. |
| 50–1 | .041 | .0032 | 7.8 | Do. |
| 51–1 | .135 | .0032 | 2.4 | Do. |
| 51–2 | .114 | .002 | 1.8 | Do. |
| | .035 | .016 | 46.0 | Oxidizing (Wemple refinery). |
| 8558 8564 | .145 | .145 | +100.0 | Do. |
| 8609 8634 | .120 | .112 | 93.4 | Do. |

TABLE IV

| Number | Cadmium | | Per cent soluble | Cooled |
|---|---|---|---|---|
| | Total | Soluble | | |
| 68–1 | 0.211 | 0.00 | 0.0 | Non-oxidizing. |
| 68–2 | .141 | .00 | 0.0 | Do. |
| 70 | .050 | .011 | 21.0 | Oxidizing. |
| 71 | .057 | .011 | 19.0 | Do. |
| 36 | .560 | .361 | 64.5 | Oxidizing (Wemple refinery). |
| 3 | .442 | .269 | 61.0 | Do. |
| 8609 8634 | .32 | .25 | 78.0 | Do. |
| 8558 8564 | .34 | .25 | 73.5 | Do. |

It is to be understood that muffle type kilns or furnaces provided with devices for controlling the atmosphere in the kiln with respect to its composition, temperature and velocity may be used in performing my process; and, as noted, satisfactory results may be obtained by operating two heating automatically-controlled furnaces arranged in tandem, the first operating under controlled reducing conditions and the second under controlled oxidizing conditions. However, in carrying out my invention, I preferably make use of a gas-fired rotary kiln of the type commonly used for calcining materials by direct contact with the gases of combustion. Such a kiln may be approximately 70 feet long lined with brick and having 5 feet inside diameter. Air seals should be disposed at both ends of the kiln to prevent accidental or casual admission of air. Using this type of kiln the zinc oxide is admitted at the high end of the kiln and is conveyed by the rotary motion of the kiln to the low or discharge end where it is discharged through a seal into a suitable receptacle. The zinc oxide moves countercurrent to the flow of the combustion gases which are admitted at the low or discharge end of the kiln. The oxide should be retained in the reaction zone of the kiln for 15 to 30 minutes.

The ratio of air to fuel admitted to the burners is automatically controlled. I prefer to use as an oxidizing flame that flame which is obtained when natural gas is burned with not less than 40% excess of air, and a reducing flame which is obtained when natural gas is burned with not less than 30% deficiency of air. Flames of similar composition can be had by the controlled combustion of other fuels such as butane, producer or water gas. The change from an oxidizing condition to a reducing condition in the kiln should not be haphazard, but the shift should be made at regular intervals and for a predetermined period of time. As at present practiced I prefer to have the burner operate under oxidizing conditions for about 5 minutes and then shift promptly to a reducing condition and operate under these conditions for about 5 minutes. The temperature and time of retention of the zinc oxide in the reaction zone will determine whether one or more alternations is required for complete refining. Conditions sometimes require a different ratio of oxidizing to reducing time. This may be done by an electrical timer that provides an adjustable ratio of reducing to oxidizing time. The temperature of the zinc oxide should not be higher than 950° C. just before it is discharged from the kiln. As mentioned above, this temperature is higher (perhaps 200° C.) than may be possible in other types of furnaces or kilns without resulting in densification.

I have shown in the accompanying drawing, for illustrative purposes only, one means for performing the present zinc refining and cadmium recovering process which apparatus is not claimed herein but which will be the subject matter of a separate application, and wherein Fig. 1 is a side elevation partly in section of my preferred apparatus; and Figs. 2 and 3 are enlarged detail views of the valves for controlling the supply of combustion fuel to the combustion chamber showing the valves in oxidizing and reducing positions, respectively.

In said drawing 1 is a brick-lined rotary kiln of conventional design at each end of which are bonnets 2 and 3. Air seals 4 and 5 are provided to prevent the entrance of casual air into the kiln while it is operating. The zinc oxide is fed into the kiln by means of a screw 6. Any dust and/or cadmium fumes driven from the zinc oxide by the reheating are drawn into a dust collecting unit 7 by means of a fan 8. A flue 9 having a butterfly valve 9a which is normally closed is provided. In the event of failure of the dust-collecting system 7 and 8 the valve 9a is opened and the fumes pass out through the flue 9. The hot zinc oxide is discharged from the furnace into a water-cooled conveyor 10, and the oxide is then discharged through an outlet 11 into a receptacle 12 having an air-sealing connection at 13 with the outlet 11.

The kiln is heated by means of a burner 14 which is associated with a combustion chamber 14a to prevent a smokey flame. The burner 14 is provided with mixers 15 and 16 which are adapted to mix the air and fuel. In the furnace illustrated natural gas is delivered to these mixers at low pressure by means of a pair of gas supply regulators 17 and 18. A blower 19 delivers the air supply to the mixers through the pipes 20 and 21 to a pair of butterfly valves 22 and 23 the former controlling the reducing gas and the latter the oxidizing gas. These valves are automatically actuated by the solenoid 24. Said butterfly valves are connected to the solenoid 24 by connecting links 25, 26 and 27 so that when one valve is open the other is closed.

The adjustments on the two mixers 15 and 16 are arranged so that one provides the oxidizing flame and the other the reducing flame depending upon the position of the valves 22 and 23. A time-controlled switch 28 is provided for closing a circuit to the solenoid 24 periodically so that during oxidizing the butterfly valve 23 is full open and the other butterfly valve 22 is closed, as shown in Fig. 2. After the lapse of the predetermined interval, say 5 minutes if the time switch is set for this period, the solenoid is again energized and the flame is changed to a reducing one by closing the valve 23 and opening the valve 22, as shown in Fig. 3. The valves 22 and 23 are moved from opened to closed position as rapidly as possible during operation of the burner. Likewise when one mixer is supplying gas the other mixer is closed.

Usually the time-controlled switch 28 is set to provide 5 minutes of oxidizing flame and 5 minutes of reducing flame, but other ratios and other intervals may be provided as required.

A gas analysis device 29 is connected at 30 and samples are taken from time to time and analyzed. Typical analyses of reducing and oxidizing gases as taken at this point are shown in Table V.

TABLE V

For a reducing atmosphere, the following are typical analyses

|  | Low reducing | High reducing |
|---|---|---|
| Deficiency of air_____per cent__ | (32.5) | (41.5) |
| Nitrogen_____per cent by volume__ | 66.58 | 64.5 |
| Oxygen_____do____ | None | None |
| Water vapor_____do____ | 13.42 | 12.7 |
| Carbon dioxide_____do____ | 6.09 | 5.6 |
| Hydrogen_____do____ | 7.52 | 9.9 |
| Carbon monoxide_____do____ | 6.26 | 7.3 |
| CH₄ or other hydrocarbons_____do____ | .13 | 0.0 |
|  | 100.00 | 100.0 |

For an oxidizing atmosphere, the following is a typical example

| | |
|---|---|
| Excess air_____per cent__ | (37.5) |
| Nitrogen_____per cent by volume__ | 78.5 |
| Oxygen_____do____ | 6.0 |
| Water vapor_____do____ | 7.65 |
| Carbon dioxide_____do____ | 7.65 |
| Carbon monoxide_____do____ | None |
| Hydrogen_____do____ | None |
| CH₄ or other hydrocarbons_____do____ | None |
| | 99.80 |

The reducing mixer is adjusted to avoid a smokey flame.

A steam jet is provided at 31 projecting through the wall of the combustion chamber 14a to supply steam to the burner, or a jet to supply an inert gas may be substituted therefor. Although the volume and temperature of the combustion gases may be such as to provide the required temperature and a sufficient volume of gases to provide volatilization of the impurities from the zinc oxide charge, normally a greater volume and an identical percentage of reducing gas without increasing the heat input of the furnace should be provided by adding steam or inert gas to the flame. The addition of steam or such inert gas provides a means for obtaining a higher velocity of gases without increasing the temperature. The jet of steam or inert gas at 31 has the additional function of modifying and controlling the temperature of the gases in the furnace. The temperature of the gases at the burner 14 in the combustion chamber is approximately 1500° C. and this temperature is reduced by the action of the jet of steam or inert gas to about 950° C. at the discharge end of the furnace as heretofore stated. As indicated on Fig. 1 the reaction zone extends between a variable point A in the furnace, which is determined by the rate of feed of the oxide and the temperature of the gases, and the point of discharge B. The area between the point A and the point C where the oxide is introduced constitutes a preheating zone for the oxide.

Further, oxidation of residual sulfides of zinc or cadmium can be prevented during the cooling of the oxide by steam or inert gas admitted at 32 to the cooling conveyor 10.

The minimum refining temperature is about 650° C. Temperatures may be determined by suitably placed pyrometers such as the one located at 33 adjacent to the discharge end of the kiln. I have found that excellent results may be obtained at 750° C. However, inasmuch as densification does not occur at temperatures as high as 950° C. in a controlled atmosphere for short periods, production may be facilitated by allowing the oxide to reach that temperature just before it is discharged from the heating zone of the furnace.

The following results, among others, will be secured with this process as heretofore described:

(1) Zinc sulfate and other zinc-sulfur compounds in the zinc oxide will be decomposed and sulfur therein volatilized and will pass out of the kiln in the gas stream.

(2) Certain metallic impurities of the zinc oxide such as cadmium, arsenic, antimony and lead compounds will be volatilized and will also pass out of the kiln in the gas stream.

(3) Any carbonaceous material present in the oxide will be oxidized during the oxidizing cycle.

(4) The cadmium values in the emitted gas stream will be recovered by the fume-collecting mechanism; and approximately 90% of the cadmium in the crude is being recovered. This cadmium so recovered consists of a mixture of cadmium dust (metallic), cadmium oxide, and cadmium sulfate.

(5) The color is improved by the removal of the carbonaceous material and metallic impurities by the oxidizing and reducing cycles, and the product is free of densification or increase in particle size and hence its texture, oil absorption and other physical characteristics are not adversely affected by the refining action.

What is claimed is:

1. A process of refining pigment zinc oxide which comprises reheating the oxide in a clean reducing atmosphere free of soot and solid carbon and removing superficial impurities at a temperature below the decomposition temperature of the zinc oxide.

2. A process of refining pigment zinc oxide which consists in calcining the oxide by direct contact with the hot gases of combustion of the fuel which are controlled as to gaseous composition, temperature and velocity to remove superficial and admixed impurities under reducing conditions that prevent a substantial decomposition of the zinc oxide.

3. A process of refining pigment zinc oxide which consists in reheating the oxide in a stream of hot, clean, reducing gases moving at a velocity between 50 and 200 feet per minute and at temperatures below the decomposition temperature of the zinc oxide to remove admixed impurities.

4. A process of refining zinc oxide which consists in heating crude pigment zinc oxide in a clean reducing atmosphere at a temperature of not less than 650° C. and not more than 950° C., said atmosphere passing over the oxide at a velocity varying from 50 to 200 feet per minute.

5. A process for refining pigment zinc oxide comprising heating the oxide in a reducing atmosphere at a temperature between 650° C. and 950° C. and then continuing the heating at the same temperature range in an oxidizing atmosphere for a similar period.

6. The process of calcining pigment zinc oxide which comprises heating the zinc oxide to remove admixed impurities by an atmosphere which is alternated from oxidizing to reducing periodically and at temperatures below the decomposition temperature of the zinc oxide.

7. The process of calcining zinc oxide to purify the same by removing superficial or admixed impurities which comprises heating the zinc oxide in a flame which is periodically alternated from oxidizing to reducing and wherein the flame is free of solid carbon and the velocity of which is controlled and at temperatures below the decomposition temperature of the zinc oxide.

8. A process of refining pigment zinc oxide which consists in passing the oxide through a furnace countercurrent to the flow of heating gases produced by the combustion of gaseous fuel and maintained free of soot and solid carbon and periodically alternating at short intervals from a reducing to an oxidizing composition and at temperatures below the decomposition temperature of zinc oxide.

9. An improvement in the refining of pigment zinc oxide which consists in calcining the oxide at a temperature of less than 950° C. in direct contact with the combustion gases to remove superficial or admixed impurities, such gases alternating from oxidizing to reducing at short intervals and repeating the alternation until purified at temperatures below the decomposition temperature of the zinc oxide.

10. The process of purifying zinc oxide which comprises reheating it at a temperature between 650° C. and 950° C. in direct contact with a flame maintained free of soot and solid carbon to remove superficial or admixed impurities, alternating the composition of the flame at short intervals from an oxidizing condition to a reducing condition, moving the flame over the oxide at a velocity of not less than 50 feet per minute, and maintaining the oxide in such an atmosphere until completely refined.

11. A process for refining zinc oxide to remove superficial or admixed impurities comprising alternately heating the oxide in a reducing atmosphere at a temperature between 650° C. and 950° C. for about 5 minutes and then continuing the heating at the same temperature range in an oxidizing atmosphere for about 5 minutes.

12. A process for refining or purifying zinc oxide which comprises reheating in a clean reducing atmosphere to remove superficial or admixed impurities at temperatures below the decomposition temperature of the zinc oxide, removing the oxide from the heating zone, and cooling while maintaining a reducing atmosphere about the oxide.

13. A continuous process for refining zinc oxide to remove sulfur and cadmium impurities which comprises feeding zinc oxide into one end of an air-sealed furnace and into direct contact with a high velocity heating gas moving countercurrently to the flow of zinc oxide, maintaining the reaction zone of the furnace at a temperature of from 650° C. to 950° C., said gases also being maintained clean and free of soot and solid carbon, and periodically alternating the gases at short intervals of time from a reducing composition to an oxidizing composition.

14. A continuous process for refining zinc oxide to remove sulfur and cadmium impurities which comprises feeding zinc oxide into an air-sealed rotary furnace having a reaction zone maintained at temperatures between 650° C. and 950° C. and into direct contact with heating gases, said gases being supplied at a relatively high velocity countercurrently to the flow of the zinc oxide, maintaining the gases clean and free of soot and solid carbon, periodically alternating the gases from a reducing composition to an oxidizing composition, and finally discharging the refined zinc oxide from the other end of the furnace through a zone at about 950° C.

15. A continuous process for refining zinc oxide to remove sulfur and cadmium impurities which comprises feeding zinc oxide into one end of an air-sealed furnace and into direct contact with a high velocity heating gas moving countercurrently to the flow of zinc oxide, maintaining the reaction zone of the furnace at a temperature of from 650° C. to 950° C., said gases also being maintained clean and free of soot and solid carbon, periodically alternating the gases at short intervals of time from a reducing composition having a 40% deficiency of air to an oxidizing composition having a 40% excess of air, and finally discharging the refined zinc oxide from the opposite end of the furnace through a zone at about 950° C. into a non-oxidizing atmosphere.

16. A continuous process for refining zinc oxide to remove sulfur and cadmium impurities which comprises feeding zinc oxide into an air-sealed rotary furnace having a reaction zone maintained at temperatures between 650° C. and 950° C. and into direct contact with heating gases, said gases being prepared by diluting a high temperature flame with steam or other inert gas, passing said gases countercurrently to the flow of the zinc oxide, maintaining the gases clean and free of soot and solid carbon, alternating the gases from a reducing composition to an oxidizing composition, and finally discharging the zinc oxide from the furnace.

17. A process for recovering the cadmium from pigment zinc oxide which consists in heating the oxide in a clean and highly reducing atmosphere and a temperature not lower than 650° C. and not higher than 950° C., and collecting the emitted vapors to recover the cadmium.

18. A process for recovering the cadmium in zinc oxide which consists of calcining the oxide in a substantial reducing atmosphere at a temperature between 900° C. and 650° C., said atmosphere passing over the oxide at a velocity between 50 and 200 feet per minute, and collecting the emitted vapors to recover the cadmium.

JOHN HENRY CALBECK.

REFERENCES CITED

The following references are of record in the file of this patent:

UNITED STATES PATENTS

| Number | Name | Date |
|---|---|---|
| 799,743 | Mackey | Sept. 19, 1905 |
| 1,014,062 | Hughes | Jan. 9, 1912 |
| 1,727,492 | Teats | Sept. 10, 1929 |
| 2,036,566 | Bunce et al. | Apr. 7, 1936 |
| 2,139,196 | Maidens | Dec. 6, 1938 |